United States Patent
Sasaki

(10) Patent No.: US 11,879,051 B2
(45) Date of Patent: *Jan. 23, 2024

(54) POLYESTER RESIN COMPOSITION

(71) Applicant: NISSHINBO CHEMICAL INC., Tokyo (JP)

(72) Inventor: Takahiro Sasaki, Chiba (JP)

(73) Assignee: NISSHINBO CHEMICAL INC., Tokyo (JP)

(*) Notice: Subject to any disclaimer, the term of this patent is extended or adjusted under 35 U.S.C. 154(b) by 100 days.

This patent is subject to a terminal disclaimer.

(21) Appl. No.: 17/601,953

(22) PCT Filed: Mar. 31, 2020

(86) PCT No.: PCT/JP2020/014845
§ 371 (c)(1),
(2) Date: Oct. 7, 2021

(87) PCT Pub. No.: WO2020/213390
PCT Pub. Date: Oct. 22, 2020

(65) Prior Publication Data
US 2022/0185990 A1  Jun. 16, 2022

(30) Foreign Application Priority Data
Apr. 15, 2019 (JP) .................. 2019-077159

(51) Int. Cl.
*C08K 5/29* (2006.01)

(52) U.S. Cl.
CPC ..................... *C08K 5/29* (2013.01)

(58) Field of Classification Search
CPC ...................................... C08K 5/29
See application file for complete search history.

(56) References Cited

U.S. PATENT DOCUMENTS 5,319,053 A * 6/1994 Slack ................ C08G 18/7837
528/48
2008/0139715 A1  6/2008 Scherzer et al.
2010/0318108 A1 * 12/2010 Datta ................... A61L 31/146
156/60
2014/0322552 A1 * 10/2014 Kawasaki ............... C08J 7/046
428/483
2015/0353708 A1  12/2015 Itoh et al.
2020/0181314 A1  6/2020 Sasaki

FOREIGN PATENT DOCUMENTS

| | | |
|---|---|---|
| CN | 104937028 A | 9/2015 |
| EP | 0 850 985 A1 | 7/1998 |
| JP | 9-249801 A | 9/1997 |
| JP | 10-7984 A | 1/1998 |
| JP | 10-182990 A | 7/1998 |
| JP | 2015-147838 A | 8/2015 |
| WO | WO 2015/119190 A1 | 8/2015 |
| WO | WO 2019/044719 A1 | 3/2019 |

OTHER PUBLICATIONS

J.A. Brydson, Plastics Materials (Seventh Edition), Butterworth-Heinemann, 1999 4—Relation of Structure to Thermal and Mechanical Properties, pp. 59-75 Editor(s): J.A. Brydson, ISBN 9780750641326 (Year: 1999).*
International Search Report, issued in PCT/JP2020/014845, dated Jun. 16, 2020.
Extended European Search Report for corresponding European Application No. 20791814.5, dated Nov. 25, 2022.
Chinese Office Action and Search Report for corresponding Chinese Application No. 202080027962.X, dated Nov. 15, 2022.

* cited by examiner

Primary Examiner — John E Uselding
(74) Attorney, Agent, or Firm — Birch, Stewart, Kolasch & Birch, LLP

(57) ABSTRACT

Provided is a polyester resin composition that exhibits excellent hydrolysis resistance and generates little isocyanate gas when heated during melt kneading and molding. The polyester resin composition contains a polyester resin (A) and a carbodiimide compound (B) having a specific structure. The content of the carbodiimide compound (B) is 0.1 to 5 parts by mass relative to a total of 100 parts by mass of the polyester resin (A) and the carbodiimide compound (B).

6 Claims, No Drawings

POLYESTER RESIN COMPOSITION

TECHNICAL FIELD

The present invention relates to a polyester resin composition.

BACKGROUND ART

Polyester resins have been extensively used in application fields such as films and sheets because they have excellent transparency, mechanical strength, melting stability, solvent resistance, and recyclability. Furthermore, in recent years, the polyester resins have also been used for housings of domestic appliances or OA equipment.

However, the polyester resins tend to readily undergo hydrolysis as compared to conventional general-purpose resins. For this reason, for the purpose of improving the hydrolysis resistance of the polyester resin, a technique of adding a carbodiimide compound to the polyester resin has been studied.

The carbodiimide compound is blended in the polyester resin, followed by molding, whereby carboxy groups in the polyester resin or carboxy groups generated by the decomposition of ester groups upon kneading the resin at a high temperature reacts with the blended carbodiimide compound, which can suppress deterioration in the initial performance (for example, mechanical strength) of a molded product. The carbodiimide compound remains in the molded product, which provides improved endurance of the molded product.

For example, a hydrolysis resistance stabilizer containing a specific aliphatic or aromatic carbodiimide compound or the like as a main component has been known as a hydrolysis resistance stabilizer for the polyester resin (Patent Literatures 1 and 2).

However, the polyester resin composition containing the specific aliphatic or aromatic carbodiimide compound has improved hydrolysis resistance, but the carbodiimide compound is decomposed when heated during melt kneading and molding, to generate isocyanate gas, which disadvantageously causes a deteriorated work environment.

CITATION LIST

Patent Literature

PTL 1: JP 09-249801 A
PTL 2: JP 2015-147838 A

SUMMARY OF INVENTION

Technical Problem

Then, it is an object of the present invention to provide a polyester resin composition that exhibits excellent hydrolysis resistance and generates little isocyanate gas when heated during melt kneading and molding.

Solution to Problem

As a result of extensive studies, the present inventors have found that a polyester resin composition contains a polyester resin (A) and a specific carbodiimide compound (B), wherein a content of the carbodiimide compound (B) is 0.1 to 5 parts by mass relative to a total of 100 parts by mass of the polyester resin (A) and the carbodiimide compound (B), to exhibit excellent hydrolysis resistance and generate little isocyanate gas when heated during melt kneading and molding, and have completed the present invention.

That is, the summary and configuration of the present invention are as follows.

[1] A polyester resin composition comprising: a polyester resin (A); and a carbodiimide compound (B) represented by the following general formula (1), wherein a content of the carbodiimide compound (B) is 0.1 to 5 parts by mass relative to a total of 100 parts by mass of the polyester resin (A) and the carbodiimide compound (B),

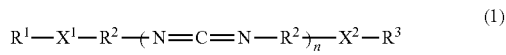

wherein $R^1$ and $R^3$ represent a residue of an organic compound having one isocyanate group-reactive functional group but excluding the isocyanate group-reactive functional group, $R^1$ and $R^3$ may be the same as or different from each other, $R^2$ represents a divalent residue of a diisocyanate compound having two isocyanate groups removed therefrom, $R^2$ has a benzene aromatic ring directly bonded to an NCN group, and has no substituent group or only one substituent group at each of both ortho positions to a position bonded to the NCN group, of the benzene aromatic ring, $X^1$ and $X^2$ represent a group formed by a reaction between the functional group of the organic compound and the isocyanate group of the diisocyanate compound, and $X^1$ and $X^2$ may be the same as or different from each other, and n represents a number of 1 to 15.

[2] The polyester resin composition according to the above [1], wherein the diisocyanate compound comprises a mixture of 2,4'-diphenylmethane diisocyanate and 4,4'-diphenylmethane diisocyanate, and a proportion of the 2,4'-diphenylmethane diisocyanate is 30 to 70 mol % and a proportion of the 4,4'-diphenylmethane diisocyanate is 30 to 70 mol % based on 100 mol % of the whole diisocyanate compound.

The polyester resin composition according to the above [2], wherein the proportion of the 2,4'-diphenylmethane diisocyanate is 50 to 60 mol % and the proportion of the 4,4'-diphenylmethane diisocyanate is 40 to 50 mol % based on 100 mol % of the whole diisocyanate compound.

[4] The polyester resin composition according to the above [2] or [3], wherein the organic compound having one isocyanate group-reactive functional group is one or more selected from the group consisting of a monoisocyanate, a monoalcohol, a monoamine, a monocarboxylic acid, and an acid anhydride.

[5] The polyester resin composition according to the above [1], wherein the diisocyanate compound comprises one or more selected from the group consisting of tolylene diisocyanate, diphenylmethane diisocyanate, naphthalene diisocyanate, and p-phenylene diisocyanate, and the organic compound having one isocyanate group-reactive functional group is one or more selected from the group consisting of a monoisocyanate excluding phenyl isocyanate, a monoalcohol having 5 or less carbon atoms, a monoamine having 5 or less carbon atoms, a monocarboxylic acid, and an acid anhydride.

[6] The polyester resin composition according to the above [1], wherein the diisocyanate compound comprises one or more selected from the group consisting of tolylene diisocyanate, diphenylmethane diisocyanate, naphthalene diisocyanate, and p-phenylene diisocyanate, and the organic compound having one isocyanate group-reactive functional group is one or more selected from the group consisting of a monoalcohol having 8 to 16 carbon atoms and a monoamine having 7 or more carbon atoms.

[7] The polyester resin composition according to the above [1], wherein the diisocyanate compound is tolidine diisocyanate, and the organic compound having one isocyanate group-reactive functional group is one or more selected from the group consisting of a monoisocyanate excluding phenyl isocyanate, a monoalcohol having 5 or less carbon atoms, a monoamine having 3 or less carbon atoms, a monocarboxylic acid, and an acid anhydride.

[8] The polyester resin composition according to the above [1], wherein the diisocyanate compound is tolidine diisocyanate, and the organic compound having one isocyanate group-reactive functional group is one or more selected from the group consisting of an aliphatic monoalcohol having 9 or more carbon atoms, a polyether monool having 18 or more carbon atoms, and a monoamine having 13 or more carbon atoms.

[9] The polyester resin composition according to the above [1], wherein the organic compound having one isocyanate group-reactive functional group is phenyl isocyanate, and n is a number of 1 or 2.

[10] The polyester resin composition according to any one of [1] to [9], wherein the polyester resin (A) is one or more selected from the group consisting of polyethylene terephthalate, polybutylene terephthalate, polybutylene succinate, polylactic acid, and polyhydroxyalkanoic acid.

Advantageous Effects of Invention

The present invention can provide a polyester resin composition that exhibits excellent hydrolysis resistance and generates little isocyanate gas when heated during melt kneading and molding.

DESCRIPTION OF EMBODIMENTS

Embodiments of a polyester resin composition according to the present invention will be described in detail below.

The polyester resin composition of the present invention contains a polyester resin (A) and a carbodiimide compound (B) represented by the following general formula (1). The content of the carbodiimide compound (B) is 0.1 to 5 parts by mass relative to a total of 100 parts by mass of the polyester resin (A) and the carbodiimide compound (B).

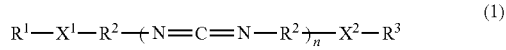

(1)

In the general formula (1), $R^1$ and $R^3$ represent a residue of an organic compound having one isocyanate group-reactive functional group but excluding the isocyanate group-reactive functional group. $R^1$ and $R^3$ may be the same as or different from each other. $R^2$ represents a divalent residue of a diisocyanate compound having two isocyanate groups removed therefrom. $R^2$ has a benzene aromatic ring directly bonded to an NCN group, and has no substituent group or only one substituent group at each of both ortho positions to a position bonded to the NCN group, of the benzene aromatic ring. $X^1$ and $X^2$ represent a group formed by a reaction between the functional group of the organic compound and the isocyanate group of the diisocyanate compound. $X^1$ and $X^2$ may be the same as or different from each other. n represents a number of 1 to 15.

Such a polyester resin composition has excellent hydrolysis resistance, and generates little isocyanate gas when heated during melt kneading and molding. Although the reason therefor is unknown, it is considered to be as follows.

The polyester resin composition of the present invention contains the carbodiimide compound (B) which is specific aromatic carbodiimide, whereby it is considered that the carbodiimide compound (B) has higher reactivity than that of conventional aliphatic carbodiimide and the polyester resin composition can exhibit excellent hydrolysis resistance even at a low carbodiimide group concentration.

In particular, the carbodiimide compound (B) has the residue $R^2$ that has a benzene aromatic ring directly bonded to an NCN group, and has no substituent group or only one substituent group at each of both ortho positions to a position bonded to the NCN group, of the benzene aromatic ring. Thereby, it is considered that, because the reactivity of isocyanate produced by decomposing is high even if the carbodiimide compound (B) is decomposed in a heating process during melt kneading and molding, the isocyanate is apt to be taken in the polyester resin, and the isocyanate is less likely to be released into the environment as isocyanate gas.

Hereinafter, the polyester resin composition of the present invention will be described in detail for each component.

<Polyester Resin (A)>

The polyester resin (A) that can be used is not particularly limited as long as it is a resin having an ester group.

The polyester resin (A) is a resin obtained, for example, by a polycondensation reaction between a dibasic acid, its acid anhydride or a dibasic acid ester and a dihydric alcohol, or a polycondensation reaction or ring opening polymerization of a hydroxycarboxylic acid or its cyclic derivative, in which the resin has an ester bond in its main chain.

Examples of the dibasic acid or its acid anhydride include phthalic acid anhydride, isophthalic acid, terephthalic acid, succinic acid, succinic anhydride, adipic acid, azelaic acid, sebacic acid, tetrahydrophthalic acid anhydride, hexahydrophthalic acid anhydride, tetrabromophthalic acid anhydride, tetrachlorophthalic acid anhydride, HET acid anhydride, endomethylene tetrohydrophthalic acid anhydride, maleic anhydride, fumaric acid, and itaconic acid.

Examples of the dibasic acid ester include dimethyl terephthalate and dimethyl naphthalenedicarboxylate.

Examples of the dihydric alcohol include ethylene glycol, propylene glycol, 1,3-butylene glycol, 1,4-butanediol, 1,6-hexanediol, diethylene glycol, dipropylene glycol, neopentyl glycol, triethylene glycol, hydrogenated bisphenol A, bisphenol A2-hydroxypropyl ether, and cyclohexanedimethanol.

Furthermore, polyalkylene oxide glycols such as polyethylene oxide glycol, polypropylene oxide glycol, polytetramethylene oxide glycol, and polyhexamethylene oxide glycol which are aliphatic polyethers having an OH group at each of both ends can also be used.

Examples of the hydroxycarboxylic acid include lactic acid and hydroxybutyric acid.

Examples of the cyclic derivative of the hydroxycarboxylic acid include lactide and lactone. Examples of the lactide include a cyclic dimer of lactic acid. Examples of the lactone include β-propiolactone and δ-valerolactone.

Specific examples of the polyester resin (A) that can be used include one or more selected from the group consisting of polyethylene terephthalate (hereinafter, also referred to as "PET"), polybutylene terephthalate (hereinafter, also referred to as PBT), polybutylene succinate (hereinafter, also referred to as PBS), polybutylene succinate adipate (hereinafter, also referred to as PBSA), polybutylene adipate terephthalate (hereinafter, also referred to as PBAT), polyethylene naphthalate, polyarylate, an ethylene terephthalate-isophthalate copolymer, polylactic acid (hereinafter, also referred to as PLA), and polyhydroxyalkanoic acids such as polyhydroxybutyric acid.

Among these, from the viewpoint of economic efficiency and processability, one or more selected from the group consisting of polyethylene terephthalate, polybutylene terephthalate, polybutylene succinate, polylactic acid, and polyhydroxyalkanoic acids are preferable, and one or more selected from the group consisting of polyethylene terephthalate and polybutylene terephthalate are more preferable.

The content of the polyester resin (A) in the polyester resin composition of the present invention is preferably 80 to 99.9% by mass, more preferably 85 to 99.8% by mass, still more preferably 90 to 99.7% by mass, and yet still more preferably 95 to 99.5% by mass.

<Carbodiimide Compound (B)>

The carbodiimide compound (B) used in the present invention is represented by the following general formula (1).

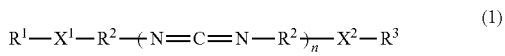

$$R^1-X^1-R^2-(N=C=N-R^2)_{\overline{n}}-X^2-R^3 \quad (1)$$

In the general formula (1), $R^1$ and $R^3$ represent a residue of an organic compound having one isocyanate group-reactive functional group but excluding the isocyanate group-reactive functional group, and $R^1$ and $R^3$ may be the same as or different from each other. $R^2$ represents a divalent residue of a diisocyanate compound having two isocyanate groups removed therefrom. $R^2$ has a benzene aromatic ring directly bonded to an NCN group, and has no substituent group or only one substituent group at each of both ortho positions to a position bonded to the NCN group, of the benzene aromatic ring. $X^1$ and $X^2$ represent a group formed by a reaction between the functional group of the organic compound and the isocyanate group of the diisocyanate compound, and $X^1$ and $X^2$ may be the same as or different from each other. n represents a number of 1 to 15.

($R^1$, $R^3$)

In the general formula (1), $R^1$ and $R^3$ represent a residue of an organic compound having one isocyanate group-reactive functional group but excluding the isocyanate group-reactive functional group, and $R^1$ and $R^3$ may be the same as or different from each other.

The organic compound having one isocyanate group-reactive functional group (hereinafter, also simply referred to as "organic compound") is not particularly limited as long as it has one isocyanate group-reactive functional group. However, it is preferably one or more selected from the group consisting of a monoisocyanate, a monoalcohol, a monoamine, a monocarboxylic acid, and an acid anhydride from the viewpoint of the reactivity.

Among these, the monoisocyanate is preferable because the content rate of a carbodiimide group in the carbodiimide compound (B) can be increased.

Examples of the monoisocyanate include lower alkyl isocyanates such as methyl isocyanate, ethyl isocyanate, propyl isocyanate, and n-, sec-, or tert-butyl isocyanate; alicyclic isocyanates such as cyclohexyl isocyanate; and aromatic isocyanates such as phenyl isocyanate, tolyl isocyanate, dimethylphenyl isocyanate, and 2,6-diisopropylphenyl isocyanate. Among these, phenyl isocyanate and tolyl isocyanate are preferable, and phenyl isocyanate is more preferable from the viewpoint of the reactivity. Meanwhile, because the phenyl isocyanate has particularly high reactivity, and the phenyl isocyanates are subjected to carbodiimidation, whereby monocarbodiimide tends to be formed, a monoisocyanate excluding phenyl isocyanate is preferable from the viewpoint of suppressing the production of the monocarbodiimide.

The monoalcohol is preferable because the monoalcohol has high reactivity with an isocyanate group to provide easy synthesis of the carbodiimide compound (B), and can effectively suppress the generation of isocyanate gas when the carbodiimide compound (B) is decomposed.

Examples of the monoalcohol include an aliphatic alcohol, an alicyclic alcohol, a polyether monool. Examples of the monoalcohol include methanol, ethanol, isopropyl alcohol, cyclohexanol, dodecyl alcohol, polyethylene glycol monomethyl ether, and polypropylene glycol monomethyl ether. Among these, from the viewpoint of excellent handleability of the carbodiimide compound (B) to be obtained, and good processability with the polyester resin (A), isopropyl alcohol and cyclohexanol are preferable, and isopropyl alcohol is more preferable. From the viewpoint of the generation of little organic volatile gas, dodecyl alcohol is preferable.

The monoamine is preferable because the monoamine has high reactivity with an isocyanate group to provide easy synthesis of the carbodiimide compound (B), and has excellent compatibility with the polyester resin (A).

Examples of the monoamine include a primary or secondary alkylamine. Examples of the monoamine include primary amines such as butylamine and cyclohexylamine; and secondary amines such as diethylamine, dibutylamine, and dicyclohexylamine. Among these, from the viewpoint of providing good processability with the polyester resin (A), butylamine and cyclohexylamine are preferable, and butylamine is more preferable.

The monocarboxylic acid and the acid anhydride are preferable because a binding site ($X^1$ and $X^2$ in the general formula (1)) produced by a reaction with an isocyanate group has excellent heat resistance, and the generation of isocyanate gas can be effectively suppressed when the carbodiimide compound (B) is decomposed.

Examples of the monocarboxylic acid include formic acid, acetic acid, propionic acid, isovaleric acid, hexanoic acid, lauric acid, myristic acid, palmitic acid, stearic acid, arachic acid, oleic acid, linoleic acid, linolenic acid, and benzoic acid. Among these, from the viewpoint of providing good processability with the polyester resin (A), acetic acid and propionic acid are preferable, and acetic acid is more preferable.

Examples of the acid anhydride include phthalic anhydride, acetic anhydride, succinic anhydride, maleic anhydride, and benzoic anhydride. Among these, from the viewpoint of providing good processability with the polyester resin (A), acetic anhydride and succinic anhydride are preferable, and acetic anhydride is more preferable.

(R²)

In the general formula (1), R² represents a divalent residue of a diisocyanate compound having two isocyanate groups removed therefrom. R² has a benzene aromatic ring directly bonded to an NCN group, and has no substituent group or only one substituent group at each of both ortho positions to a position bonded to the NCN group, of the benzene aromatic ring. The diisocyanate compound has one or two or more benzene aromatic rings. The two isocyanate groups are directly bonded to the same benzene aromatic ring or different benzene aromatic rings. The benzene aromatic ring to which each isocyanate group is bonded has no substituent group at each of both the ortho positions to the bonding position of the isocyanate group. That is, the benzene aromatic ring to which each isocyanate group is bonded has a substituent group only at one of both the ortho positions to the bonding position of the isocyanate group, or has no substituent group at each of both the ortho positions.

The carbodiimide compound (B) used in the present invention has high reactivity with a carboxy group because the carbodiimide group (—N=C=N—) is directly bonded to the benzene aromatic ring. The carbodiimide compound (B) is considered to be able to exhibit excellent hydrolysis resistance even at a lower carbodiimide group concentration than that of conventional aliphatic polycarbodiimide.

The carbodiimide compound (B) used in the present invention has the residue R² that has a benzene aromatic ring directly bonded to an NCN group, and has no substituent group or only one substituent group at each of both ortho positions to a position bonded to the NCN group, of the benzene aromatic ring. Thereby, the release of isocyanate to be produced, as gas from the composition can be effectively suppressed even if the carbodiimide compound (B) is decomposed when heated during melt kneading and molding.

In particular, the isocyanate produced by the decomposition of the carbodiimide compound (B) having predetermined R² has higher reactivity than that of a conventional carbodiimide compound (for example, a carbodiimide compound having a residue that has a benzene aromatic ring directly bonded to an NCN group, and has a substituent group at each of both ortho positions to a position bonded to the NCN group, of the benzene aromatic ring), whereby it is inferred that the isocyanate is likely to react with a component in the polyester resin (A), and to be taken in into the resin.

In particular, in the case of the carbodiimide compound (B) in which the molecular weight of a R² portion is comparatively large, the molecular weight of the isocyanate produced by decomposing is also comparatively large, whereby it is inferred that the isocyanate is more likely to remain in the polyester resin (A) than one having a low-molecular weight.

R² is derived from a divalent residue excluding two isocyanate groups from a diisocyanate compound having a benzene aromatic ring directly bonded to an isocyanate group, and having no substituent group or only one substituent group at each of both ortho positions to a position bonded to the NCN group, of the benzene aromatic ring.

The diisocyanate compound is not particularly limited as long as it has a benzene aromatic ring directly bonded to an isocyanate group, and has no substituent group or only one substituent group at each of both ortho positions to a position bonded to the NCN group, of the benzene aromatic ring. Examples of the diisocyanate compound include tolylene diisocyanate (also referred to as toluene diisocyanate; hereinafter, may be abbreviated as "TDI"), tolidine diisocyanate (also referred to as dimethylbiphenyl diisocyanate; hereinafter, may be abbreviated as "TODI"), diphenylmethane diisocyanate (hereinafter, may be abbreviated as "MDI"), naphthalene diisocyanate (hereinafter, may be abbreviated as "NDI"), and p-phenylene diisocyanate (also referred to as 1,4-phenylene diisocyanate).

Here, the tolylene diisocyanate includes two kinds of isomers of 2,4-TDI and 2,6-TDI. The tolylene diisocyanate is preferably a mixture of 2,4-TDI and 2,6-TDI. Specifically, a mixture of 2,4-TDI (80 mol %) and 2,6-TDI (20 mol %) is common.

The diphenylmethane diisocyanate includes three kinds of isomers of 2,2'-MDI, 2,4'-MDI, and 4,4'-MDI. The diphenylmethane diisocyanate is preferably 4,4'-MDI as a simple substance, and a mixture of 2,4'-MDI and 4,4'-MDI. Among these, a mixture of 2,4'-MDI and 4,4'-MDI is more preferable from the viewpoint of suppressing an increase in the melt viscosity of the carbodiimide compound (B) to be produced. In the mixture of 2,4'-MDI and 4,4'-MDI, the proportion of 2,4'-MDI is preferably 30 to 70 mol %, more preferably 40 to 65 mol %, and still more preferably 50 to 60 mol %. Here, the proportion of 4,4'-MDI is the balance obtained by subtracting the proportion of 2,4'-MDI from the whole mixture (100 mol %).

Generally, the tolidine diisocyanate is 3,3'-dimethylbiphenyl-4,4'-diisocyanate.

Generally, the naphthalene diisocyanate is 1,5-naphthalene diisocyanate.

From the viewpoint of hydrolysis resistance and effective suppression of the generation of isocyanate gas, the diisocyanate compound preferably contains one or more selected from the group consisting of tolylene diisocyanate, tolidine diisocyanate, diphenylmethane diisocyanate, naphthalene diisocyanate, and p-phenylene diisocyanate, more preferably contains diphenylmethane diisocyanate, and still more preferably contains a mixture of 2,4'-MDI and 4,4'-MDI.

When the diisocyanate compound contains one or more selected from the group consisting of tolylene diisocyanate, tolidine diisocyanate, diphenylmethane diisocyanate, naphthalene diisocyanate, and p-phenylene diisocyanate, the proportion (total) of one or more compounds selected from the group in the whole diisocyanate compound is preferably 80 mol % or more, more preferably 90 mol % or more, and still more preferably 95 mol % or more. The diisocyanate compound may be composed of only one or more compounds selected from the group. The diisocyanate compound is preferably one selected from the group from the viewpoint of the ease of producing management and reduction in a production cost.

When the diisocyanate compound contains the mixture of 2,4'-MDI and 4,4'-MDI, it is preferable that the proportion of 2,4'-MDI is 30 to 70 mol % and the proportion of 4,4'-MDI is 30 to 70 mol % based on 100 mol % of the whole diisocyanate compound. When the proportion of 2,4'-MDI is 30 mol % or more, the carbodiimide compound (B) is less likely to be gelled, whereby good preservation stability and solubility in a solvent can be provided. When the proportion of 2,4'-MDI is 70 mol % or less, steric hindrance is not excessively large, which provides good reactivity of the carbodiimide compound (B). When the diisocyanate compound is used with the polyester resin (A), desired performance is likely to be obtained. From such a viewpoint, the proportion of 2,4'-MDI in the diisocyanate compound is more preferably 40 to 65 mol %, and still more preferably 50 to 60 mol %. The proportion of 4,4'-MDI is more preferably 35 to 60 mol %, and still more preferably 40 to 50 mol %.

When the diisocyanate compound contains one or more selected from the group consisting of tolylene diisocyanate, diphenylmethane diisocyanate, naphthalene diisocyanate, and p-phenylene diisocyanate, the organic compound is preferably one or more selected from the group consisting of a monoisocyanate excluding phenyl isocyanate, a monoalcohol having 5 or less carbon atoms, a monoamine having 5 or less carbon atoms, a monocarboxylic acid, and an acid anhydride, or one or more selected from the group consisting of a monoalcohol having 8 to 16 carbon atoms and a monoamine having 7 or more carbon atoms. In this case, the proportion (total) of one or more compounds selected from the group consisting of tolylene diisocyanate, diphenylmethane diisocyanate, naphthalene diisocyanate, and p-phenylene diisocyanate in the whole diisocyanate compound is preferably 80 mol % or more, more preferably 90 mol % or more, and still more preferably 95 mol % or more. The diisocyanate compound may be composed of only one or more compounds selected from the group.

When the diisocyanate compound is tolidine diisocyanate, the organic compound is preferably one or more selected from the group consisting of a monoisocyanate excluding phenyl isocyanate, a monoalcohol having 5 or less carbon atoms, a monoamine having 3 or less carbon atoms, a monocarboxylic acid, and an acid anhydride, or one or more selected from the group consisting of an aliphatic monoalcohol having 9 or more carbon atoms, a polyether monool having 18 or more carbon atoms, and a monoamine having 13 or more carbon atoms.

When the diisocyanate compound contains two or more diisocyanate compounds, $R^2$ is represented by two or more residues.

($X^1$, $X^2$)

In the general formula (1), $X^1$ and $X^2$ represent a group formed by a reaction between the isocyanate group-reactive functional group of the organic compound and the isocyanate group of the diisocyanate compound, and $X^1$ and $X^2$ may be the same as or different from each other. For example, when the organic compound is a monoisocyanate, $X^1$ and $X^2$ are a group represented by the following formula (I). When the organic compound is a monoalcohol, $X^1$ and $X^2$ are a group represented by the following formula (II). When the organic compound is a monoamine, $X^1$ and $X^2$ are a group represented by the following formula (III). When the organic compound is a monocarboxylic acid, $X^1$ and $X^2$ are a group represented by the following formula (IV). When the organic compound is an acid anhydride, $X^1$ and $X^2$ are a group represented by the following formula (V).

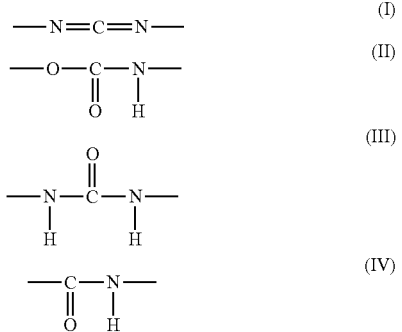

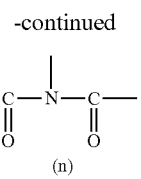

In the general formula (1), n represents a number of 1 to 15. From the viewpoint of suppression of an increase in the melt viscosity of the polyester resin composition, n is preferably 1 to 9.

When the diisocyanate compound is naphthalene diisocyanate and p-phenylene diisocyanate, n is preferably 1 to 15. When the diisocyanate compound is tolylene diisocyanate, n is preferably 6 to 15. When the diisocyanate compound is tolidine diisocyanate, n is preferably 1 to 9. When the diisocyanate compound is diphenylmethane diisocyanate, and the organic compound is one or more selected from the group consisting of a monoisocyanate excluding phenyl isocyanate, a monoalcohol, a monoamine, a monocarboxylic acid, and an acid anhydride, n is preferably 1 to 10, and more preferably 1 to 9. When the organic compound is phenyl isocyanate, n is preferably 1 or 2.

Note that n may be referred to as a degree of polymerization. Here, the degree of polymerization means the number of carbodiimide groups contained in the carbodiimide compound (B). Therefore, when $X^1$ and $X^2$ are groups represented by the formulae (II) to (IV), the degree of polymerization meaning the number of the carbodiimide groups contained in the carbodiimide compound (B) has the same value as that of n. However, when $X^1$ and $X^2$ are a group represented by the formula (I), the number of the carbodiimide groups of $X^1$ and $X^2$ is included in the degree of polymerization, whereby the degree of polymerization is n+2.

(Equivalent of Carbodiimide)

The equivalent of carbodiimide of the carbodiimide compound (B) (chemical formula weight per 1 mol of carbodiimide groups) is preferably 200 to 1,500, more preferably 200 to 1,250, more preferably 200 to 1,000, and still more preferably 200 to 500, from the viewpoint of the hydrolysis resistance of the polyester resin composition.

(Content of Carbodiimide Compound (B))

The content of the carbodiimide compound (B) is 0.1 to 5 parts by mass, preferably 0.2 to 3 parts by mass, and more preferably 0.3 to 2 parts by mass, relative to a total of 100 parts by mass of the polyester resin (A) and the carbodiimide compound (B), from the viewpoint of the hydrolysis resistance of the polyester resin composition, and suppression of the generation of isocyanate gas.

(Method for Producing Carbodiimide Compound (B))

The carbodiimide compound (B) of the present invention can be produced by a known method.

Examples of the method include (i) a method including subjecting a diisocyanate compound to a carbodiimidization reaction in the presence of a catalyst to obtain an isocyanate-terminated carbodiimide, and then adding an organic compound having one isocyanate group-reactive functional group to the isocyanate-terminated carbodiimide to perform an end-capping reaction, (ii) a method including subjecting a diisocyanate compound and an organic compound having one isocyanate group-reactive functional group to a carbodiimidization reaction and an end-capping reaction in the presence of a catalyst, and (iii) a method including reacting a diisocyanate compound and an organic compound having one isocyanate group-reactive functional group, followed by addition of a catalyst thereto and then performing a carbodiimidization reaction and an end-capping reaction.

In the present invention, the carbodiimide compound is preferably produced by the method of (ii) from the viewpoint of controlling the number of n in the general formula (1).

Here, specific examples of the diisocyanate compound are as described above. The diisocyanate compounds may be used alone or in combination of two or more.

Examples of the catalyst used in the carbodiimidization reaction include 3-methyl-1-phenyl-2-phospholene-1-oxide, 3-methyl-1-ethyl-2-phospholene-1-oxide, 1,3-dimethyl-2-phospholene-1-oxide, 1-phenyl-2-phospholene-1-oxide, 1-ethyl-2-phospholene-1-oxide, 3-methyl-2-phospholene-1-oxide, and 1-methyl-2-phospholene-1-oxide. Among these, preferred is 3-methyl-1-phenyl-2-phospholene-1-oxide which has good reactivity and is industrially available with ease. These may be used alone or in combination of two or more.

The amount of the catalyst used can be appropriately determined according to the kind of the catalyst to be used, but is preferably 0.01 to 10 parts by mass, more preferably 0.05 to 5.0 parts by mass, and still more preferably 0.1 to 3.0 parts by mass, relative to 100 parts by mass of the diisocyanate compound.

The carbodiimidization reaction can be carried out without any solvent or in a solvent. Examples of the solvent that can be used include alicyclic ethers such as tetrahydrofuran, 1,3-dioxane, and dioxolane; aromatic hydrocarbons such as benzene, toluene, xylene, and ethylbenzene; halogenated hydrocarbons such as chlorobenzene, dichlorobenzene, trichlorobenzene, perchlene, trichloroethane, and dichloroethane; and cyclohexanone. These may be used alone or in combination of two or more.

The conditions for the carbodiimidization reaction are not particularly limited. However, when any solvent is not used, a reaction temperature is preferably 40 to 150° C., more preferably 60 to 140° C., and still more preferably 80 to 130° C., from the viewpoint of productivity. When the reaction is performed in a solvent, the reaction temperature is preferably 40° C. or higher and equal to or lower than the boiling point of the solvent.

The reaction time of the carbodiimidization reaction is preferably 10 minutes to 30 hours, more preferably 1 to 20 hours, still more preferably 1 to 10 hours, and yet still more preferably 2 hours to 4 hours, from the viewpoint of productivity.

By reacting the diisocyanate compound and/or the isocyanate-terminated carbodiimide with the organic compound having one isocyanate group-reactive functional group, the isocyanate group contained in the diisocyanate compound and/or the isocyanate group contained in the isocyanate-terminated carbodiimide are capped with the organic compound.

That is, the organic compound having one isocyanate group-reactive functional group serves as an end-capping agent. Specific examples of the organic compound are as described above. The organic compounds may be used alone or in combination of two or more thereof. The amount of the organic compound to be blended may be appropriately adjusted so that in the general formula (1), n is within the above-described range.

<Other Components>

The polyester resin composition may contain, if necessary, appropriately additives such as a pigment, a filler, a leveling agent, a surfactant, a dispersant, an ultraviolet absorber, an antioxidant, a flame retardant, and a colorant.

<Total Content of Polyester Resin (A) and Carbodiimide Compound (B)>

The total content of the polyester resin (A) and carbodiimide compound (B) in the polyester resin composition of the present invention is preferably 90 to 100% by mass, more preferably 92 to 100% by mass, and still more preferably 95 to 100% by mass, from the viewpoint of the hydrolysis resistance, mechanical characteristics, suppression of an increase in melt viscosity, processability, and suppression of generation of isocyanate gas, of the polyester resin composition.

<Method for Producing Polyester Resin Composition>

The polyester resin composition of the present invention can be produced, for example, by blending a polyester resin (A) with a carbodiimide compound (B), and other components to be added if necessary, followed by melt kneading. The polyester resin composition of the present invention contains the carbodiimide compound (B), whereby isocyanate gas is less likely to be generated also during melt kneading, which causes no deteriorated work environment.

The melt kneading may be performed using a mixer equipped with heating means. The order of charge of the respective materials to the mixer is not particularly limited. However, it is preferable that the polyester resin as the base resin is first charged and melted in the mixer, and then the carbodiimide compound and additives to be added if necessary are charged into the mixer.

The melt kneading time may be appropriately determined depending upon the shape and rotating speed of a screw, and the like, and is usually about 1 to about 30 minutes. The melt kneading temperature varies depending upon the kind of polyester resin as the base resin, and is usually about 150 to about 350° C.

The polyester resin composition of the present invention can provide a good-quality molded article without causing a deteriorated work environment in a manufacturing process.

When a molded article is obtained from the polyester resin composition of the present invention, the polyester resin composition may be molded during the above-described melt kneading by extrusion molding, injection molding, or blow molding or the like. The polyester resin composition may be compounded into a master batch or the like once, followed by melt-kneading the resulting master batch with other materials, and molding the resulting kneaded material.

The polyester resin composition of the present invention can effectively suppress the generation of isocyanate gas during heat molding even in any of the above molding methods, which causes no deteriorated work environment. The molded article obtained from the polyester resin composition of the present invention has good hydrolysis resistance, whereby the molded article has excellent various performances such as strength.

The embodiments of the present invention have been described above; however, the present invention is not limited to the above embodiments. The present invention includes all kinds of aspects included in the concept and Claims of the present invention, and the aspects can be varied within the scope of the present invention.

EXAMPLES

Hereinafter, the present invention will be described in more detail with reference to Examples. However, the present invention is not limited to the following Examples at all.

Hereinafter, various materials used in Synthetic Examples, Examples, and Comparative Examples will be shown.

<Diisocyanate Compound>

Mixture of 54% by mass of 2,4'-diphenylmethane diisocyanate and 46% by mass of 4,4'-diphenylmethane diisocyanate (mixture of 2,4'-MDI (54%) and 4,4'-MDI (46%)): product name "Monomeric MDI; Millionate NM" manufactured by Tosoh Corporation Mixture of 80% by mass of 2,4-tolylene diisocyanate and 20% by mass of 2,6-tolylene diisocyanate (mixture of 2,4-TDI (80%) and 2,6-TDI (20%)): product name "Cosmonate T-80" manufactured by Mitsui Chemicals & SKC Polyurethanes Inc.

4,4'-diphenylmethane diisocyanate (4,4'-MDI): product name "Millionate MT" manufactured by Tosoh Corporation 1,5-naphthalene isocyanate (1,5-NDI): product name "ND" manufactured by Mitsui Chemicals & SKC Polyurethanes Inc.

3,3'-dimethylbiphenyl-4,4'-diisocyanate (tolidine diisocyanate; TODI): product name "TODI" manufactured by Nippon Soda Co., Ltd.

4,4'-dicyclohexylmethane diisocyanate (HMDI): product name "Desmodur W" manufactured by Sumika Covestro Urethane Co., Ltd.

m-tetramethyl xylylene diisocyanate (TMXDI): product name "TMXDI" manufactured by Allnex Japan Inc.

<End-Capping Agent>

Dodecyl alcohol: manufactured by Kanto Chemical Co., Inc.

Isopropyl alcohol: manufactured by Kanto Chemical Co., Inc.

Cyclohexylamine: manufactured by Tokyo Chemical Industry Co., Ltd.

Phenyl isocyanate: manufactured by Lanxess Inc.

<Carbodiimidization Catalyst>

3-methyl-1-phenyl-2-phospholene-1-oxide

<Solvent>

Tetrahydrofuran (THF): manufactured by Mitsubishi Chemical Holdings Corporation

<Polyester Resin (A)>

Polybutylene terephthalate (PBT) resin: product name "NOVADURAN 5010L" manufactured by Mitsubishi Engineering-Plastics Corporation Polyethylene terephthalate (PET) resin: product name "TRN-8500FF" manufactured by Teijin Chemicals Ltd.

Polylactic acid (PLA) resin: product name "Ingeo Biopolymer4032D" manufactured by Natureworks Synthetic Example 1

A reaction vessel equipped with a reflux condenser and a stirrer was charged with a diisocyanate compound, an end-capping agent, and a carbodiimidization catalyst shown in Table 1 at a ratio shown in Table 1, and the mixture was stirred under a nitrogen flow at 110° C. for 2 hours.

Then, it was confirmed by infrared (IR) spectrum measurement that an absorption peak attributed to an isocyanate group at a wavelength of about 2270 cm$^{-1}$ almost disappeared, and a carbodiimide compound P1 of n=6 was obtained.

Synthetic Example 2

In Synthetic Example 2, a carbodiimide compound P2 of n=10 was obtained in the same manner as in Synthetic Example 1 except that a diisocyanate compound, an end-capping agent, and a carbodiimidization catalyst shown in Table 1 were blended at a ratio shown in Table 1.

Synthetic Example 3

In synthetic Example 3, a carbodiimide compound P3 of n=6 was obtained in the same manner as in Synthetic Example 1 except that a diisocyanate compound, an end-capping agent, and a carbodiimidization catalyst shown in Table 1 were blended at a ratio shown in Table 1.

Synthetic Example 4

In synthetic Example 4, a carbodiimide compound P4 of n=9 was obtained in the same manner as in Synthetic Example 1 except that a diisocyanate compound, an end-capping agent, and a carbodiimidization catalyst shown in Table 1 were blended at a ratio shown in Table 1.

Synthetic Example 5

In synthetic Example 5, a carbodiimide compound P5 of n=2 (degree of polymerization: 4) was obtained in the same manner as in Synthetic Example 1 except that a diisocyanate compound, an end-capping agent, and a carbodiimidization catalyst shown in Table 1 were blended at a ratio shown in Table 1.

Synthetic Example 6

In synthetic Example 6, a carbodiimide compound P6 of n=6 was obtained in the same manner as in Synthetic Example 1 except that a diisocyanate compound, an end-capping agent, and a carbodiimidization catalyst shown in Table 1 were blended at a ratio shown in Table 1.

Synthetic Example 7

A reaction vessel equipped with a reflux condenser and a stirrer was charged with a diisocyanate compound, an end-capping agent, a solvent (THF), and a carbodiimidization catalyst shown in Table 1 at a ratio shown in Table 1, and the mixture was stirred under a nitrogen flow at 70° C. for 3 hours.

Then, it was confirmed by IR spectrum measurement that an absorption peak attributed to an isocyanate group at a wavelength of about 2270 cm$^{-1}$ almost disappeared, and a THF solution of a carbodiimide compound of n=6 obtained. Then, the THF was volatilized, followed by drying, to obtain a carbodiimide compound P7.

Synthetic Example 8

In synthetic Example 8, a carbodiimide compound P8 of n=6 was obtained in the same manner as in Synthetic Example 7 except that a diisocyanate compound, an end-capping agent, a solvent, and a carbodiimidization catalyst shown in Table 1 were blended at a ratio shown in Table 1.

Synthetic Example 9

In synthetic Example 9, a carbodiimide compound P9 of n=6 was obtained in the same manner as in Synthetic Example 7 except that a diisocyanate compound, an end-capping agent, a solvent, and a carbodiimidization catalyst shown in Table 1 were blended at a ratio shown in Table 1.

Synthetic Example 10

A reaction vessel equipped with a reflux condenser and a stirrer was charged with a diisocyanate compound and a carbodiimidization catalyst shown in Table 1 at a ratio shown in Table 1, and the mixture was stirred under a nitrogen flow at 185° C. for 24 hours to obtain isocyanate-terminated poly-4,4'-dicyclohexylmethane carbodiimide.

The measured ratio of NCO was 3.78%, and n was 9.

Then, the isocyanate-terminated poly-4,4'-dicyclohexylmethane carbodiimide was heated to 150° C., and 14.2 parts by mass of an end-capping agent shown in Table 1 was added thereto, followed by stirring for 3 hours. Then, it was confirmed by IR spectrum measurement that an absorption peak attributed to an isocyanate group at a wavelength of about 2270 cm$^{-1}$ almost disappeared, and a carbodiimide compound P10 of n=9 was obtained.

Synthetic Example 11

A reaction vessel equipped with a reflux condenser and a stirrer was charged with a diisocyanate compound and a carbodiimidization catalyst shown in Table 1 at a ratio shown in Table 1, and the mixture was reacted under a nitrogen flow at 180° C. for 32 hours to obtain isocyanate-terminated tetramethylxylylene carbodiimide.

The measured proportion of NCO was 3.74%, and n was 10.

Then, the isocyanate-terminated tetramethylxylylene carbodiimide was heated to 150° C., and 13.9 parts by mass of an end-capping agent shown in Table 1 was added thereto, followed by stirring for 3 hours. Then, it was confirmed by IR spectrum measurement that an absorption peak attributed to an isocyanate group at a wavelength of about 2270 cm$^{-1}$ almost disappeared, and a carbodiimide compound P11 of n=10 was obtained.

Example 1

99 parts by mass of a PBT resin as a polyester resin (A) was melted under a condition of 250° C. using a lab mixer, and 1 part by mass of the carbodiimide compound P1 obtained in Synthetic Example 1 as a carbodiimide compound (B) was then added thereto, followed by mixing for 3 minutes, to obtain a polyester resin composition.

Example 2

In Example 2, a polyester resin composition was obtained in the same manner as in Example 1 except that the amount of a PBT resin blended was changed from 99 parts by mass to 97 parts by mass, and the amount of a carbodiimide compound P1 blended was changed from 1 part by mass to 3 parts by mass.

Examples 3 to 10

In Examples 3 to 10, polyester resin compositions were obtained in the same manner as in Example 1 except that the carbodiimide compounds P2 to 9 obtained in Synthetic Examples 2 to 9 were used in place of the carbodiimide compound P1 obtained in Synthetic Example 1.

Comparative Examples 1 and 2

In Comparative Examples 1 and 2, polyester resin compositions were obtained in the same manner as in Example 1 except that the carbodiimide compounds P10 and 11 obtained in Synthetic Examples 10 and 11 were used in place of the carbodiimide compound P1 obtained in Synthetic Example 1.

TABLE 1

| | | Diisocyanate compound | | End-capping agent | | Solvent (THF) | Carbodiimidization catalyst | Carbodiimide compound | | |
|---|---|---|---|---|---|---|---|---|---|---|
| | | Kind | Parts by mass | Kind | Parts by mass | Parts by mass | Parts by mass | Kind | n | Equivalent of carbodiimide |
| Synthetic Examples | 1 | Mixture of 2,4'-MDI (54%) and 4,4'-MDI (46%) | 100 | Dodecyl alcohol | 21.3 | — | 0.5 | P1 | 6 | 310 |
| | 2 | Mixture of 2,4'-MDI (54%) and 4,4'-MDI (46%) | 100 | Dodecyl alcohol | 13.5 | — | 0.5 | P2 | 10 | 268 |
| | 3 | Mixture of 2,4'-MDI (54%) and 4,4'-MDI (46%) | 100 | Isopropyl alcohol | 6.9 | — | 0.5 | P3 | 6 | 268 |
| | 4 | Mixture of 2,4'-MDI (54%) and 4,4'-MDI (46%) | 100 | Cyclohexylamine | 7.9 | — | 0.5 | P4 | 9 | 256 |
| | 5 | Mixture of 2,4'-MDI (54%) and 4,4'-MDI (46%) | 100 | Phenyl isocyanate | 31.7 | — | 0.5 | P5 | 2 | 203 |
| | 6 | Mixture of 2,4-TDI (80%) and 2,6-TDI (20%) | 100 | Dodecyl alcohol | 30.5 | — | 0.5 | P6 | 6 | 221 |
| | 7 | 4,4'-MDI | 100 | Dodecyl alcohol | 21.3 | 300 | 0.5 | P7 | 6 | 310 |
| | 8 | 1,5-NDI | 100 | Dodecyl alcohol | 25.3 | 300 | 0.5 | P8 | 6 | 263 |
| | 9 | TODI | 100 | Dodecyl alcohol | 20.1 | 300 | 0.5 | P9 | 6 | 326 |
| | 10 | HMDI | 100 | Dodecyl alcohol | 14.2 | — | 0.5 | P10 | 9 | 288 |
| | 11 | TMXDI | 100 | Dodecyl alcohol | 13.9 | — | 2 | P11 | 10 | 262 |

Comparative Example 3

In Comparative Example 3, a polyester resin composition was obtained in the same manner as in Example 1 except that (2,4,6-triisopropylbenzene)polycarbodiimide (product name "STABAXOL (R) P-100" manufactured by Rhein Chemie Corporation, "St" in Table) was used in place of the carbodiimide compound P1 obtained in Synthetic Example 1.

Comparative Example 4

In Comparative Example 4, a polyester resin composition was obtained in the same manner as in Example 1 except that the amount of a PBT resin blended was changed from 99 parts by mass to 93 parts by mass, and the amount of a carbodiimide compound P1 blended was changed from 1 part by mass to 7 parts by mass.

Comparative Example 5

In Comparative Example 5, a polyester resin composition was obtained in the same manner as in Example 1 except that a carbodiimide compound was not used.

Examples 11 to 20 and Comparative Examples 6 to 10

In Examples 11 to 20 and Comparative Examples 6 to 10, polyester resin compositions were obtained in the same manner as in Examples 1 to 10 and Comparative Examples 1 to 5 except that a PET resin was used in place of a PBT resin, and a melting temperature was changed from 250° C. to 280° C.

Examples 21 to 30 and Comparative Examples 11 to 15

In Examples 21 to 30 and Comparative Examples 11 to 15, polyester resin compositions were obtained in the same manner as in Examples 1 to 10 and Comparative Examples 1 to 5 except that a PLA resin was used in place of a PBT resin, and a melting temperature was changed from 250° C. to 200° C.

Evaluation

The characteristics of the polyester resin compositions according to Examples and Comparative Examples were evaluated in the following manner. The results are shown in Tables 2 to 4.

[1] Generation of Isocyanate Gas

Examples 1 to 20 and Comparative Examples 1 to 10

The melt-kneaded polyester resin composition was heated at 300° C. for 20 minutes, and gas generated in GC-MS was analyzed.

As the GC-MS, product name "6890GC system" manufactured by Shimadzu Corporation was used.

The detected amount (generation amount) of isocyanate gas was preferably smaller, and the evaluation was made at the following detection levels depending on the detected amount.

<Detection Level and Its Reference Value>

A: the case where the detected amount of isocyanate gas is less than 500 ppm

B: the case where the detected amount of isocyanate gas is 500 ppm or more and less than 1000 ppm C: the case where the detected amount of isocyanate gas is 1000 ppm or more

Examples 21 to 30 and Comparative Examples 11 to 15

In Examples 21 to 30 and Comparative Examples 11 to 15, gas analysis was performed in the same manner as in Example 1 and the like except that a heating temperature was changed from 300° C. to 200° C., and the detected amount of isocyanate gas was evaluated.

[2] Strength Retention Rate (Hydrolysis Resistance)

Examples 1 to 10 and Comparative Examples 1 to 5

As the evaluation index of hydrolysis resistance, a strength retention rate (%) after a highly accelerated life test was obtained by the following method.

<Highly Accelerated Life Test>

The melt-kneaded polyester resin composition was subjected to plate pressing at a temperature equal to or higher than a softening point to produce a sheet having a thickness of about 300 μm, and from the sheet, a strip-like sheet having a width of 10 mm and a length of 70 mm was produced.

The strip-like sheet was placed in a highly accelerated life test apparatus ("HAST CHAMBER EHS-210M" manufactured by ESPEC CORPORATION), and retained for 72 hours and 120 hours under conditions of 121° C. and 100% RH, to perform a highly accelerated life test.

<Measurement of Tensile Strength>

The tensile strength of each of a sample before the test, a sample after elapse of 72 hours of the test, and a sample after elapse of 120 hours of the test was measured under the following conditions.

The tensile strength was measured at room temperature (20° C.±5° C.) using a tensile test machine (product name "INSTRON3365" manufactured by INSTRON CORPORATION). Each sample was measured five times (five strip-like sheets), and the average value of the measured values (N=5) was taken as the tensile strength of the sample.

<Calculation of Strength Retention Rate>

A strength retention rate (%) was calculated according to the following formula (I) as a ratio of the tensile strength of the sample after elapse of 72 hours of the test or after elapse of 120 hours of the test to the sample before the test.

$$\text{Strength retention rate} = [\text{tensile strength after test}]/[\text{tensile strength before test}] \times 100(\%) \quad (I)$$

A larger strength retention rate means that the tensile strength is maintained before and after the highly accelerated life test, which means excellent hydrolysis resistance of the polyester resin composition.

Examples 11 to 20 and Comparative Examples 6 to 10

In Examples 11 to 20 and Comparative Examples 6 to 10, strength retention rates were obtained in the same manner as in Example 1 and the like except that retention times in the highly accelerated life test were changed from 72 hours and 120 hours to 24 hours and 40 hours.

Examples 21 to 30 and Comparative Examples 11 to 15

In Examples 21 to 30 and Comparative Examples 11 to 15, strength retention rates were obtained in the same manner as in Example 1 and the like except that a thermo-hygrostat (PH-2KT-E manufactured by ESPEC CORPORATION) was used in place of a highly accelerated life test apparatus in a highly accelerated life test, and retention conditions were changed to retentions for 24 hours and 48 hours under conditions of 85° C. and RH 85%.

TABLE 2

| | | Polyester resin composition | | Evaluation of characteristics | | |
| | | PBT resin | Carbodiimide compound | Generation of isocyanate gas | Strength retention rate (hydrolysis resistance) 121° C., 100% RH | |
| | | | | | 72 hours | 120 hours |
| | | Parts by mass | Kind | Parts by mass | Detection level | % | % |
|---|---|---|---|---|---|---|---|
| Examples | 1 | 99 | P1 | 1 | A | 102 | 110 |
| | 2 | 97 | P1 | 3 | B | 100 | 91 |
| | 3 | 99 | P2 | 1 | A | 101 | 108 |
| | 4 | 99 | P3 | 1 | A | 100 | 103 |
| | 5 | 99 | P4 | 1 | A | 101 | 99 |
| | 6 | 99 | P5 | 1 | A | 102 | 101 |
| | 7 | 99 | P6 | 1 | B | 104 | 94 |
| | 8 | 99 | P7 | 1 | A | 106 | 100 |
| | 9 | 99 | P8 | 1 | B | 100 | 101 |
| | 10 | 99 | P9 | 1 | B | 105 | 98 |
| Comparative Examples | 1 | 99 | P10 | 1 | C | 89 | 46 |
| | 2 | 99 | P11 | 1 | C | 61 | 24 |
| | 3 | 99 | St | 1 | C | 100 | 50 |
| | 4 | 93 | P1 | 7 | C | 80 | 76 |
| | 5 | 100 | — | — | A | 17 | 0 |

TABLE 3

| | | Polyester resin composition | | Evaluation of characteristics | | |
| | | PET resin | Carbodiimide compound | Generation of isocyanate gas | Strength retention rate (hydrolysis resistance) 121° C., 100% RH | |
| | | | | | 24 hours | 40 hours |
| | | Parts by mass | Kind | Parts by mass | Detection level | % | % |
|---|---|---|---|---|---|---|---|
| Examples | 11 | 99 | P1 | 1 | A | 98 | 86 |
| | 12 | 97 | P1 | 3 | B | 101 | 81 |
| | 13 | 99 | P2 | 1 | A | 101 | 89 |
| | 14 | 99 | P3 | 1 | A | 101 | 88 |
| | 15 | 99 | P4 | 1 | A | 104 | 80 |
| | 16 | 99 | P5 | 1 | A | 99 | 78 |
| | 17 | 99 | P6 | 1 | B | 102 | 83 |
| | 18 | 99 | P7 | 1 | A | 96 | 85 |
| | 19 | 99 | P8 | 1 | B | 102 | 91 |
| | 20 | 99 | P9 | 1 | B | 98 | 78 |
| Comparative Examples | 6 | 99 | P10 | 1 | C | 72 | 52 |
| | 7 | 99 | P11 | 1 | C | 53 | 21 |
| | 8 | 99 | St | 1 | C | 101 | 82 |
| | 9 | 93 | P1 | 7 | C | 72 | 65 |
| | 10 | 100 | — | — | A | 35 | 13 |

TABLE 4

| | | Polyester resin composition | | | Evaluation of characteristics | | |
| | | | | | Generation of isocyanate gas | Strength retention rate (hydrolysis resistance) 85° C., 85% RH | |
| | | PLA resin | Carbodiimide compound | | | 24 hours | 48 hours |
| | | Parts by mass | Kind | Parts by mass | Detection level | % | % |
|---|---|---|---|---|---|---|---|
| Examples | 21 | 99 | P1 | 1 | A | 100 | 92 |
| | 22 | 97 | P1 | 3 | B | 100 | 92 |
| | 23 | 99 | P2 | 1 | A | 100 | 96 |
| | 24 | 99 | P3 | 1 | A | 100 | 96 |
| | 25 | 99 | P4 | 1 | A | 100 | 95 |
| | 26 | 99 | P5 | 1 | A | 100 | 100 |
| | 27 | 99 | P6 | 1 | B | 100 | 98 |
| | 28 | 99 | P7 | 1 | A | 100 | 92 |
| | 29 | 99 | P8 | 1 | B | 100 | 98 |
| | 30 | 99 | P9 | 1 | B | 100 | 93 |
| Comparative Examples | 11 | 99 | P10 | 1 | C | 100 | 100 |
| | 12 | 99 | P11 | 1 | C | 80 | 68 |
| | 13 | 99 | St | 1 | C | 100 | 100 |
| | 14 | 93 | P1 | 7 | C | 84 | 79 |
| | 15 | 100 | — | — | A | 23 | 0 |

As shown in Tables 2 to 4, the polyester resin compositions (Examples 1 to 30) containing the carbodiimides P1 to P9 as the carbodiimide compound (B) specified in the present invention at predetermined proportions were confirmed to have excellent hydrolysis resistance and be less likely to generate isocyanate gas (detection levels A and B).

In contrast to this, all of the polyester resin compositions (Comparative Examples 1 to 3, 6 to 8, and 11 to 13) containing the carbodiimide compound other than the carbodiimide compound (B) specified in the present invention, and all of the polyester resin compositions (Comparative Examples 4, 9, and 14) containing a too large amount of the carbodiimide compound (B) specified in the present invention were confirmed to cause a large generation amount of isocyanate gas (detection level C) than that of the polyester resin compositions (Examples 1 to 30) of the present invention.

The polyester resin compositions (Comparative Examples 5, 10, and 15) containing no carbodiimide compound did not generate isocyanate gas, but these were confirmed to have much poorer hydrolysis resistance than that of the polyester resin compositions (Examples 1 to 30) of the present invention.

When the carbodiimide compounds P10 and P11 other than the carbodiimide compound (B) specified in the present invention, and (2,4,6-triisopropylbenzene)polycarbodiimide are contained, deterioration in the hydrolysis resistance of the polyester resin composition to be obtained was confirmed depending on the relationship with the kind (for example, PBT resin) of the polyester resin (A) to be combined.

Furthermore, when a too large amount of the carbodiimide compound is contained, deterioration in the hydrolysis resistance of the polyester resin composition to be obtained was confirmed regardless of the kind of the polyester resin (A) to be combined.

The invention claimed is:
1. A polyester resin composition comprising:
a polyester resin (A); and
a carbodiimide compound (B) represented by the following general formula (1),
wherein a content of the carbodiimide compound (B) is 0.1 to 5 parts by mass relative to a total of 100 parts by mass of the polyester resin (A) and the carbodiimide compound (B),

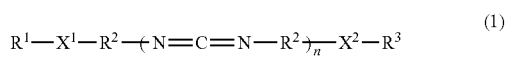

$$R^1-X^1-R^2-(N=C=N-R^2)_n-X^2-R^3 \quad (1)$$

wherein $R^1$ and $R^3$ represent a residue of an organic compound having one isocyanate group-reactive functional group but excluding the isocyanate group-reactive functional group,
$R^1$ and $R^3$ may be the same as or different from each other,
$R^2$ represents a divalent residue of a diisocyanate compound having two isocyanate groups removed therefrom,
$R^2$ has a benzene aromatic ring directly bonded to an NCN group, and has no substituent group or only one substituent group at each of both ortho positions to a position bonded to the NCN group, of the benzene aromatic ring,
$X^1$ and $X^2$ represent a group formed by a reaction between the functional group of the organic compound and the isocyanate group of the diisocyanate compound, and $X^1$ and $X^2$ may be the same as or different from each other,
n represents a number of 1 to 15,
wherein the diisocyanate compound comprises a mixture of 2,4'-diphenylmethane diisocyanate and 4,4'-diphenylmethane diisocyanate,
a proportion of the 2,4'-diphenylmethane diisocyanate is 30 to 70 mol % and a proportion of the 4,4'-diphenylmethane diisocyanate is 30 to 70 mol % based on 100 mol % of the whole diisocyanate compound,
the equivalent of carbodiimide of the carbodiimide compound (B) (chemical formula weight per 1 mol of carbodiimide groups) is 200 to 1,500, and
the polyester resin (A) is one or more selected from the group consisting of polybutylene succinate, polylactic acid, and polyhydroxyalkanoic acid.

2. The polyester resin composition according to claim 1, wherein the proportion of the 2,4'-diphenylmethane diisocyanate is 50 to 60 mol % and the proportion of the 4,4'-diphenylmethane diisocyanate is 40 to 50 mol % based on 100 mol % of the whole diisocyanate compound.

3. The polyester resin composition according to claim 1, wherein the organic compound having one isocyanate group-reactive functional group is one or more selected from the group consisting of a monoisocyanate, a monoalcohol, a monoamine, a monocarboxylic acid, and an acid anhydride.

4. The polyester resin composition according to claim 1,
wherein the organic compound having one isocyanate group-reactive functional group is one or more selected from the group consisting of a monoisocyanate excluding phenyl isocyanate, a monoalcohol having 5 or less carbon atoms, a monoamine having 5 or less carbon atoms, a monocarboxylic acid, and an acid anhydride.

5. The polyester resin composition according to claim 1,
wherein the organic compound having one isocyanate group-reactive functional group is one or more selected from the group consisting of a monoalcohol having 8 to 16 carbon atoms and a monoamine having 7 or more carbon atoms.

6. The polyester resin composition according to claim 1,
wherein the organic compound having one isocyanate group-reactive functional group is phenyl isocyanate, and
n is a number of 1 or 2.

\* \* \* \* \*